US006745740B1

(12) United States Patent
Decuir (10) Patent No.: US 6,745,740 B1
(45) Date of Patent: Jun. 8, 2004

(54) VIBRATION DAMPENING ARRANGEMENT FOR INTERNAL COMBUSTION ENGINES

(75) Inventor: Alex Decuir, Pinon Hills, CA (US)

(73) Assignee: Decuir Engine Technologies, LLC, Los Angeles, CA (US)

( * ) Notice: Subject to any disclaimer, the term of this patent is extended or adjusted under 35 U.S.C. 154(b) by 0 days.

(21) Appl. No.: 10/365,477

(22) Filed: Feb. 13, 2003

(51) Int. Cl.⁷ .................................................. F02B 75/06
(52) U.S. Cl. ...................................... 123/192.1; 74/604
(58) Field of Search .......................... 123/192.1; 74/604

(56) References Cited

U.S. PATENT DOCUMENTS

| 538,722 A | 5/1895 | Biedermann |
| 1,367,478 A | 2/1921 | Hapgood |
| 2,064,086 A | 12/1936 | Short et al. |
| 3,188,152 A | 6/1965 | Miller |
| 3,390,925 A | 7/1968 | Fangman |
| 4,114,961 A | 9/1978 | Pithie |
| 4,254,743 A | 3/1981 | Reid et al. |
| 4,362,341 A | 12/1982 | Matsumoto et al. |
| 4,461,585 A | 7/1984 | Mahrus et al. |
| 4,617,884 A | 10/1986 | Allen et al. |
| 4,926,810 A | 5/1990 | Diehl et al. |
| 5,517,957 A | 5/1996 | Wagner et al. |
| 6,044,818 A | 4/2000 | Decuir |

FOREIGN PATENT DOCUMENTS

| DE | 3813223 | 11/1989 |
| GB | 882299 | 11/1961 |
| JP | 08261233 | 10/1996 |

*Primary Examiner*—Noah P. Kamen
(74) *Attorney, Agent, or Firm*—Liniak, Berenato & White (57) ABSTRACT

An internal combustion engine comprises a crankshaft having at least one rod journal and at least one main journal, a cylinder block rotatably supporting the crankshaft, at least one coupling member rotatably coupled to the crankshaft. The at least one coupling member has an annular, substantially cylindrical inner wall defining a crank bore circumscribing one of the main journals and/or one of the rod journals of the crankshaft. Moreover, the inner wall of the crank bore has at least one substantially annular recessed portion formed therein which is axially spaced from opposite ends of the inner wall. The internal combustion engine further comprises a vibration dampener assembly disposed in the recessed portions formed in the coupling member thereby substantially dampening and isolating transmission of vibrations between the connecting rods and the crankshaft and between the connecting rod and the cylinder block.

17 Claims, 12 Drawing Sheets

VIBRATION DAMPENING ARRANGEMENT FOR INTERNAL COMBUSTION ENGINES

BACKGROUND OF THE INVENTION

1. Field of the Invention

The present invention relates to absorption/isolation of vibrations in internal combustion engines, and is more particularly directed to absorbing/isolating vibrations between a connecting rod/bearing cap assembly or crankshaft main bearing assembly and the crankshaft of an internal combustion engine.

2. Description of the Prior Art

In the conventional multi-piston type internal combustion engine pistons are coupled to a crank shaft by connecting rods to translate the reciprocating motion of the pistons to the rotary motion of the crankshaft. Explosions in the combustion engine create vibrations which are transmitted to the connecting rods and from the connecting rods to the crankshaft to a cylinder block. These vibrations increase in force and frequency in high speed engines.

Conventionally, the connecting rods which house rod bearings are separated from a rod journal by a thin layer of lubricating oil. Similarly, the sides of the connecting rod are bathed in lubricating oil preventing contact with the crankshaft. Because of the relative incompressibility of this oil layer, vibrations are easily transmitted from the connecting rod/bearing assembly to the crankshaft and from the crankshaft to the cylinder block causing maintenance problems and wearing and tearing the engine.

In order to alleviate this problem, prior art engines incorporate various vibration dampening devices. Normally they are attached to the crankshaft at an end opposite a flywheel. The vibration dampeners are normally either viscous filled or a hydraulic paddle wheel type. Often, the engines are provided with one or more balancing shafts (providing the appropriate imbalance) to balance the rotating mass of the engine and reduce engine harmonic vibrations.

However, the vibration dampening devices of the prior art suffer from the drawback that they can not be simply incorporated into conventional internal combustion engine designs, are expensive to manufacture, heavy, bulky, complicated and are located far from a source of the vibrations. Therefore, there is a need for a vibration absorbing/isolating device for an internal combustion engine to alleviate all of the drawbacks of the prior art in a simple, efficient and inexpensive manner.

SUMMARY OF THE INVENTION

The present invention provides a vibration dampener arrangement adapted to isolate vibrations between connecting rods and a crankshaft and/or between the crankshaft and a cylinder block of an internal combustion engine and prevent/reduce vibrations from being transmitted to the crankshaft and/or to the cylinder block and, consequently, to remaining portions of a drive train assembly.

An internal combustion engine in accordance with the present invention comprises a crankshaft having at least one rod journal and at least one main journal, a cylinder block rotatably supporting the crankshaft, at least one coupling member rotatably coupled to the crankshaft. The at least one coupling member has an annular, substantially cylindrical inner wall defining a crank bore circumscribing one of the main journals and/or one of the rod journals of the crankshaft. Moreover, the inner wall of the crank bore has at least one substantially annular recessed portion formed therein which is axially spaced from opposite ends of the inner wall. The internal combustion engine of the present invention further comprises a vibration dampener assembly disposed in the at least one recessed portion thereby substantially dampening a transmission of vibrations in the internal combustion engine.

The internal combustion (IC) engine of the present invention includes a cylinder block having a plurality of piston receiving bores for receiving a piston which reciprocates therein. The IC engine further includes a crankshaft having a plurality of rod journals which are rotatably mounted by bearings to the lower ends of connecting rods.

The crankshaft further includes a plurality of main journals adapted for rotatably supporting the crankshaft by the IC engine. The cylinder block further includes a plurality of crankshaft support members each comprising a main bearing portion integrally formed within the engine block, and a main bearing cap. The main bearing cap is connected to the corresponding main bearing portion to circumscribe the main journal of the crankshaft through semi-cylindrical bearing shell. The main bearing portions includes a centrally disposed, semi-cylindrical inner wall adapted for receiving a semi-cylindrical bearing shell which, in turn, receives the upper half of the main journal of the crankshaft. The inner wall of the main bearing portion has two longitudinally opposite ends defining a thickness of the inner wall. The main bearing cap includes a semi-cylindrical inner wall substantially symmetrical to the previously discussed semi-cylindrical inner wall of the main bearing portion. The inner wall of the main bearing cap has two longitudinally opposite ends defining a thickness of the inner wall. Each of the crankshaft support members has a crank bore defined by the inner wall of the main bearing portions and the complementary inner wall of the main bearing cap.

The connecting rod in accordance with the present invention, has a split first end adapted for holding the rod journal of the crankshaft and connecting rod bearing shells, and a second end defining a pin opening provided to receive a piston pin. The first end has a crank bore adapted for receiving the rod journal of the crankshaft and the connecting rod bearing shells, and defined by an annular, substantially cylindrical inner wall. The crank bore of the first end of the connecting rod has two longitudinally opposite ends defining a thickness of the crank bore.

In order to effectively reduce and eliminate the transmission of vibration and its harmonics from the connecting rod to the crankshaft and/or from the crankshaft to the cylinder block, a vibration dampener assembly is disposed between the connecting rod and the crankshaft and/or between the crankshaft and the cylinder block.

The vibration dampener assembly in accordance with the first exemplary embodiment of the present invention comprises a pair of substantially semi-annular recessed portions formed in the inner wall of the main bearing cap, a pair of complementary substantially semi-annular recessed portions formed in the inner wall of the main bearing portion of the crankshaft support member, and two pairs of opposite, semi-annular vibration dampener members each disposed in the semi-annular recessed portions. Moreover, the semi-annular recessed portions are axially spaced from the opposite ends of the inner wall of the main bearing cap, while the semi-annular recessed portions formed in the inner wall of the main bearing cap are axially spaced from the opposite ends of the inner wall of the main bearing portions of the crankshaft support member. Preferably, the recessed portions are substantially equidistantly spaced from the opposite ends of the inner wall of the main bearing cap and opposite ends of the inner wall of the main bearing portions.

Preferably, the two pairs of vibration dampener members together form O-ring-like rings and have substantially circular cross-section. Correspondingly, the semi-annular recessed portions have substantially semi-circular cross-sections substantially complementary to the cross-sections of the vibration dampener members. Further preferably, the vibration dampener members are made of a slippery elastomeric oil resistant rubber-like material.

The vibration dampener assembly in accordance with the second exemplary embodiment of the present invention comprises a substantially semi-annular recessed portion formed in the inner wall of the main bearing cap, a substantially semi-annular recessed portion formed in the inner wall of the main bearing portions of the crankshaft support member, and a pair of opposite, semi-annular vibration dampener members each disposed in the semi-annular recessed portion. Moreover, the semi-annular recessed portion is axially spaced from the opposite ends of the inner wall of the main bearing cap, while the semi-annular recessed portion formed in the inner wall of the main bearing cap is axially spaced from the opposite ends of the inner wall of the main bearing portions of the crankshaft support member. Preferably, the recessed portions are substantially equidistantly spaced from the opposite ends of the inner wall of the main bearing cap and opposite ends of the inner wall of the main bearing portions.

Preferably, the two vibration dampener members together form an O-ring-like member and have substantially circular cross-sections. Correspondingly, the semi-annular recessed portions have substantially semi-circular cross-sections substantially complementary to the cross-section of the vibration dampener members. Further preferably, the vibration dampener members are made of a slippery elastomeric oil resistant rubber-like material.

The vibration dampener arrangement in accordance with the third exemplary embodiment of the present invention comprises a recessed portion formed in the inner wall of the first end of the connecting rod and is axially offset from the opposite ends thereof. A pair of opposite, semi-annular vibration dampener members are disposed within the annular recessed portion in the inner wall of the connecting rod. The vibration dampener member is preferably made of an oil resistant elastomeric rubber-like material.

Alternatively, in accordance with the fourth exemplary embodiment of the present invention, each connecting rod may have two opposite, substantially annular recessed portions formed in an inner wall of the crank opening of the first end and axially offset from opposite side faces thereof. Each of the annular recessed portions is adapted to receive the pair of semi-annular vibration dampener members provided for substantially dampening a transmission of vibrations from the connecting rod to the crankshaft. Preferably, the vibration dampener members are substantially equidistantly spaced (offset) from the opposite side faces of the first end of the connecting rod.

Therefore, the present invention provides a simple and inexpensive vibration dampener arrangement for isolating/reducing the engine vibrations at their source, i.e. between the connecting rods and the crankshaft, before they are transmitted through the crankshaft to the other components of the engine, and between the connecting rod and the cylinder block, and prevent/reduce the vibrations from being transmitted to the crankshaft and/or to the cylinder block and consequently to the remaining portions of the drive train assembly.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

FIGS. 1–7 of the drawings illustrate the exemplary embodiment of an internal combustion engine (IC engine), generally designated with the reference numeral 1, provided with a vibration dampener of the present invention.

Figure 1:
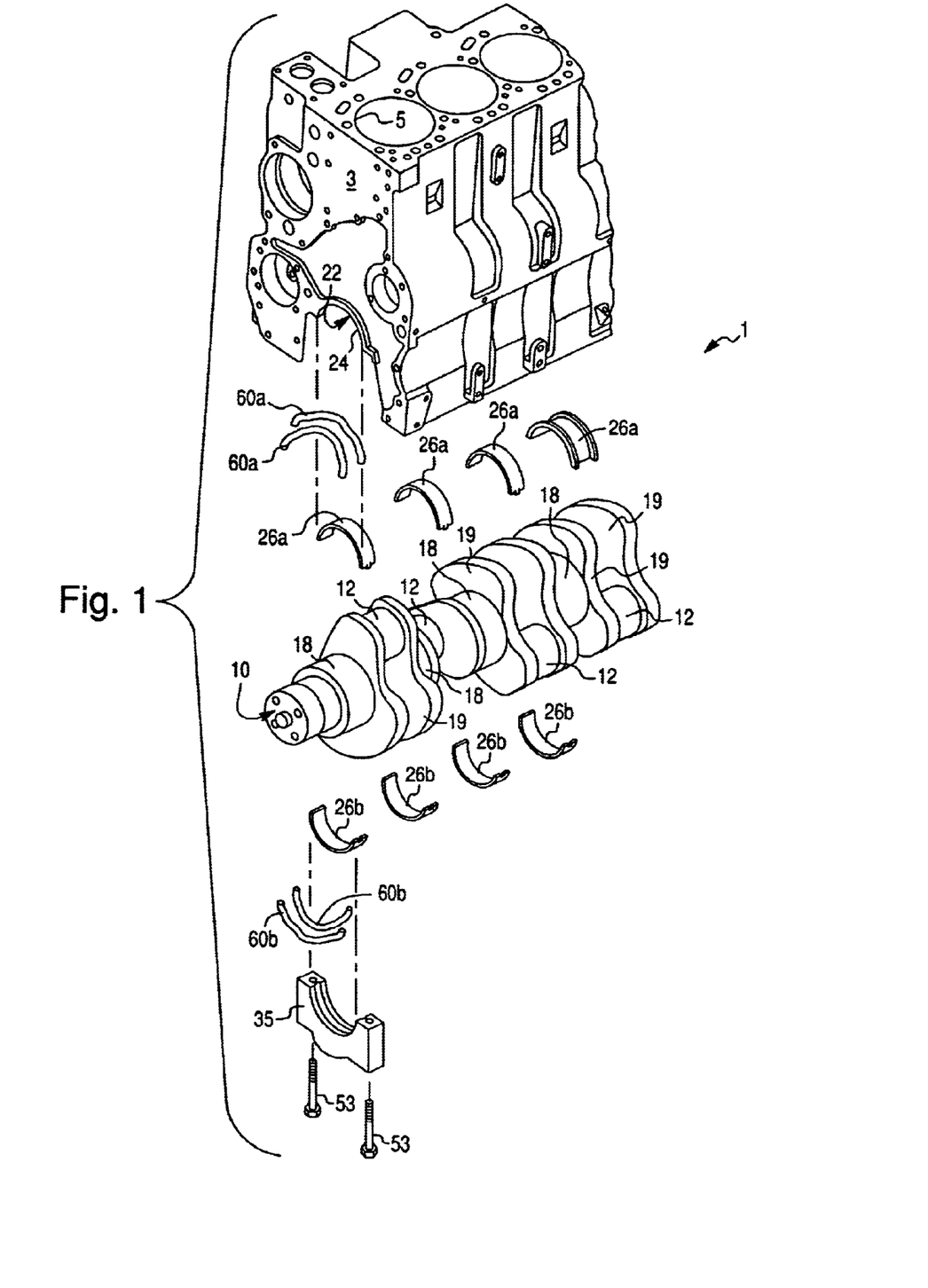
FIG. 1 is a partial exploded view of an internal combustion engine according to the first exemplary embodiment of the present invention.

With the reference to FIGS. 1–4, wherein like numerals designate like components throughout all the several figures, the internal combustion engine 1 includes a cylinder block 3 having a plurality of piston receiving bores 5 for receiving a piston (not shown) which reciprocates therein. The IC engine 1 further includes a crankshaft 10 having a plurality of rod journals 12 which are rotatably mounted by bearings 14 to lower ends of connecting rods 16. It will be appreciated by those skilled in the art that while only four rod journals 12 and only three cylinders 5 are illustrated in FIG. 1, the IC engine 1 may include any appropriate number of cylinders, such as one, two, three, etc., and may be of in-line engine as well as V-engine or opposed-cylinder engine configuration.

The crankshaft 10 further includes a plurality of main journals 18 adapted for rotatably supporting the crankshaft 10 by the IC engine 1. The crankshaft 10 converts the reciprocating motion of the pistons 7 into rotary motion in a manner well known in the mechanical arts. In order to help balance the radial forces which the connecting rod 16 apply to main journals 18 through the rod journals 12, the crankshaft 10 includes a series of counterweights 19 as shown.

Figure 2:
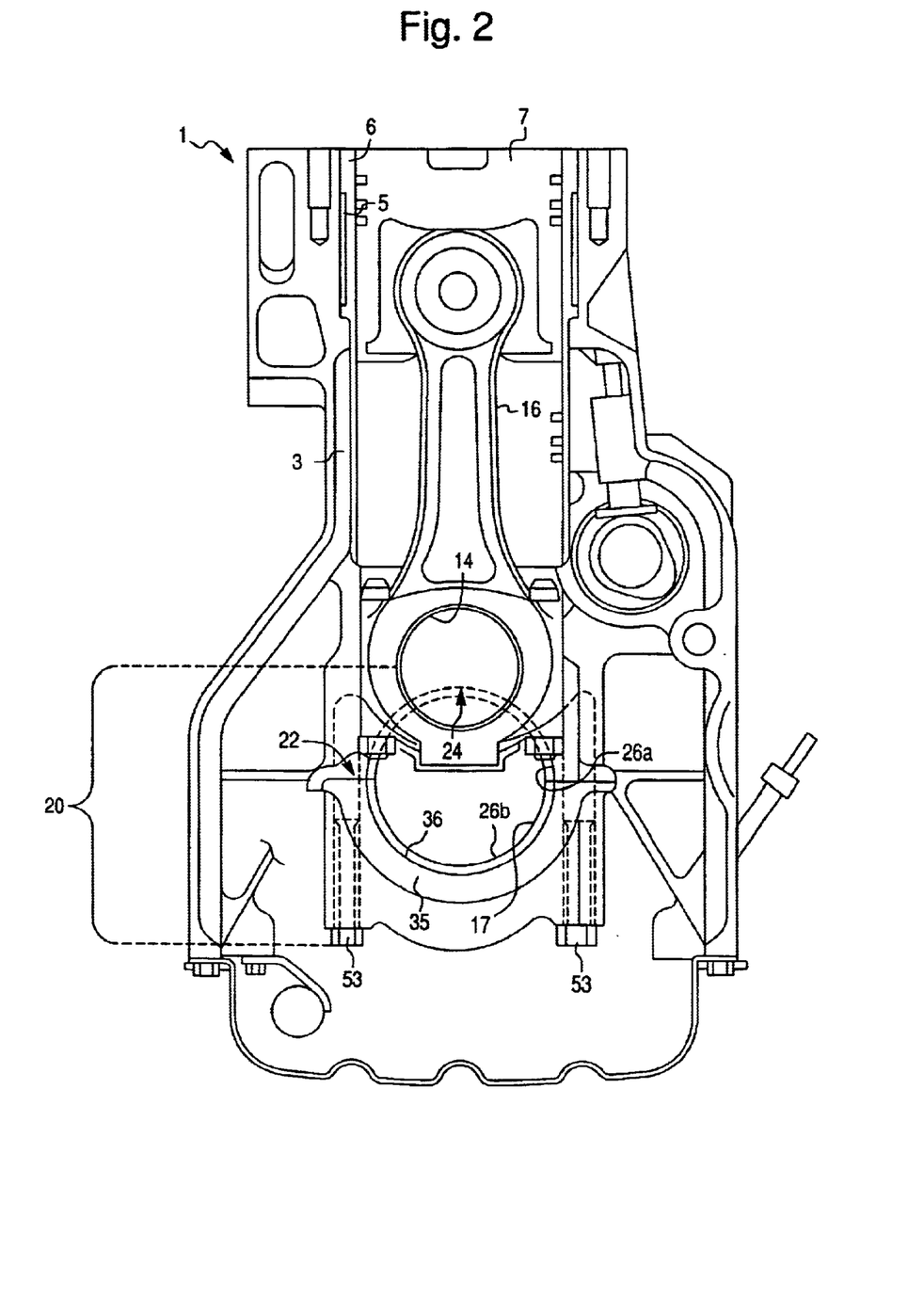
FIG. 2 is a cross sectional view of the internal combustion engine of the present invention.
Figure 3:
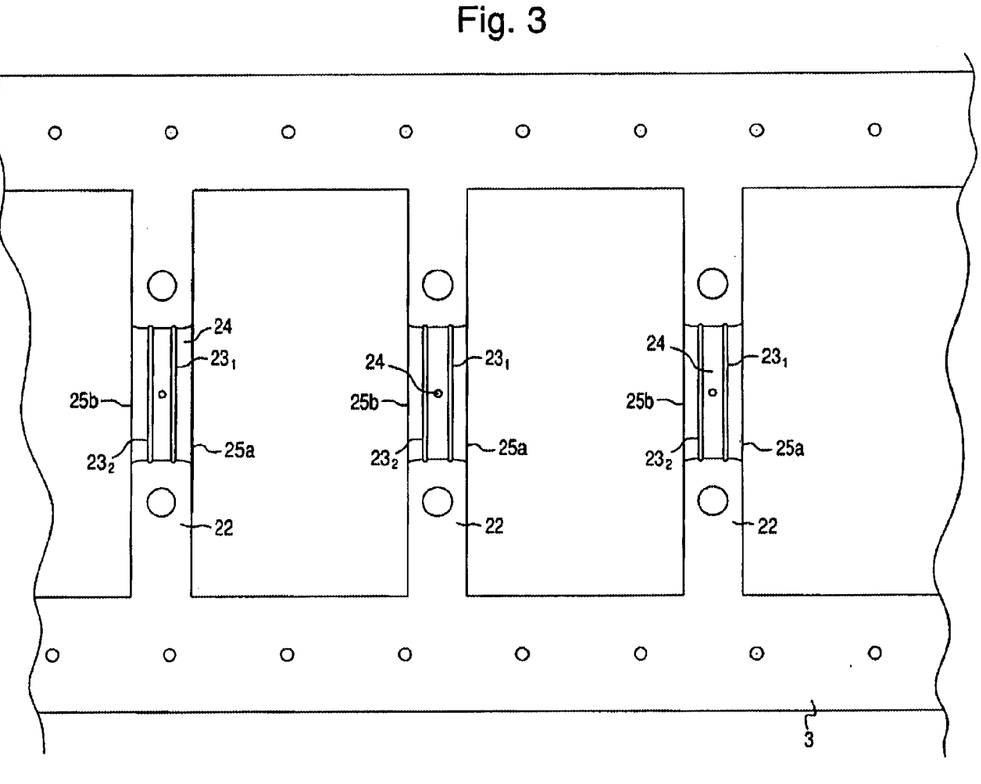
FIG. 3 is a bottom view of a cylinder block of the internal combustion engine with removed main bearing caps in accordance with the first exemplary embodiment of the present invention.
Figure 4:
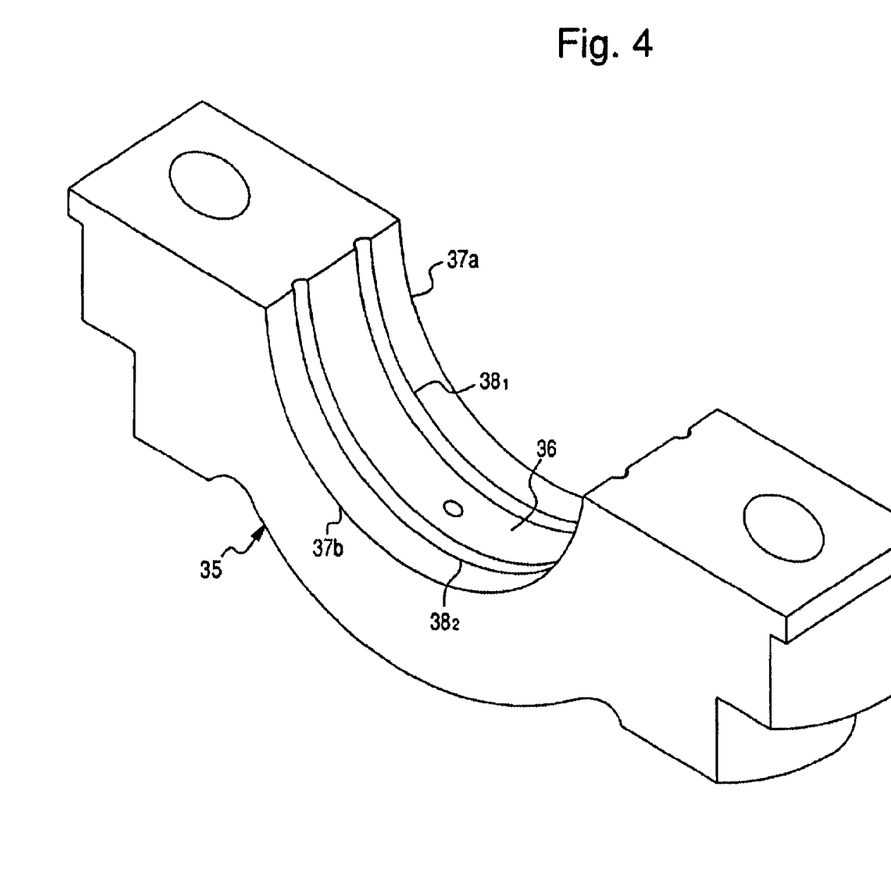
FIG. 4 is a perspective view of a main bearing cap according to the first exemplary embodiment of the present invention.

The cylinder block 3 further includes a plurality of crankshaft support members 20 each comprising a main bearing portion 22, which may be integrally formed within the engine block 3, and a main bearing cap 35. The main bearing cap 35 is connected to the corresponding main bearing portion 22 by any suitable means well known in the art, such as threaded bolts 53, to circumscribe the main journal 18 of the crankshaft through semi-cylindrical bearing shell 26a and 26b. As illustrated in FIGS. 1 and 2, the main bearing portions 22 includes a centrally disposed, semi-cylindrical inner wall 24 adapted for receiving a semi-cylindrical bearing shell 26a which, in turn, receives the upper half of the main journal 18 of the crankshaft 10. The inner wall 24 of the main bearing portions 22 has two longitudinally opposite ends 25a and 25b defining a thickness of the inner wall 24. As further illustrated in FIGS. 1, 2 and 3, the main bearing cap 35 includes a semi-cylindrical inner wall 36 substantially symmetrical to the previously discussed semi-cylindrical inner wall 24 of the main bearing portions 22. The inner wall 36 of the main bearing cap 35 has two longitudinally opposite ends 37a and 37b defining a thickness of the inner wall 36. Each of the crankshaft support members 20 has a crank bore 17 defined by the inner wall 24 of the main bearing portions 22 and the complementary inner wall 36 of the main bearing cap 35, as shown in FIG. 2.

Figure 5:
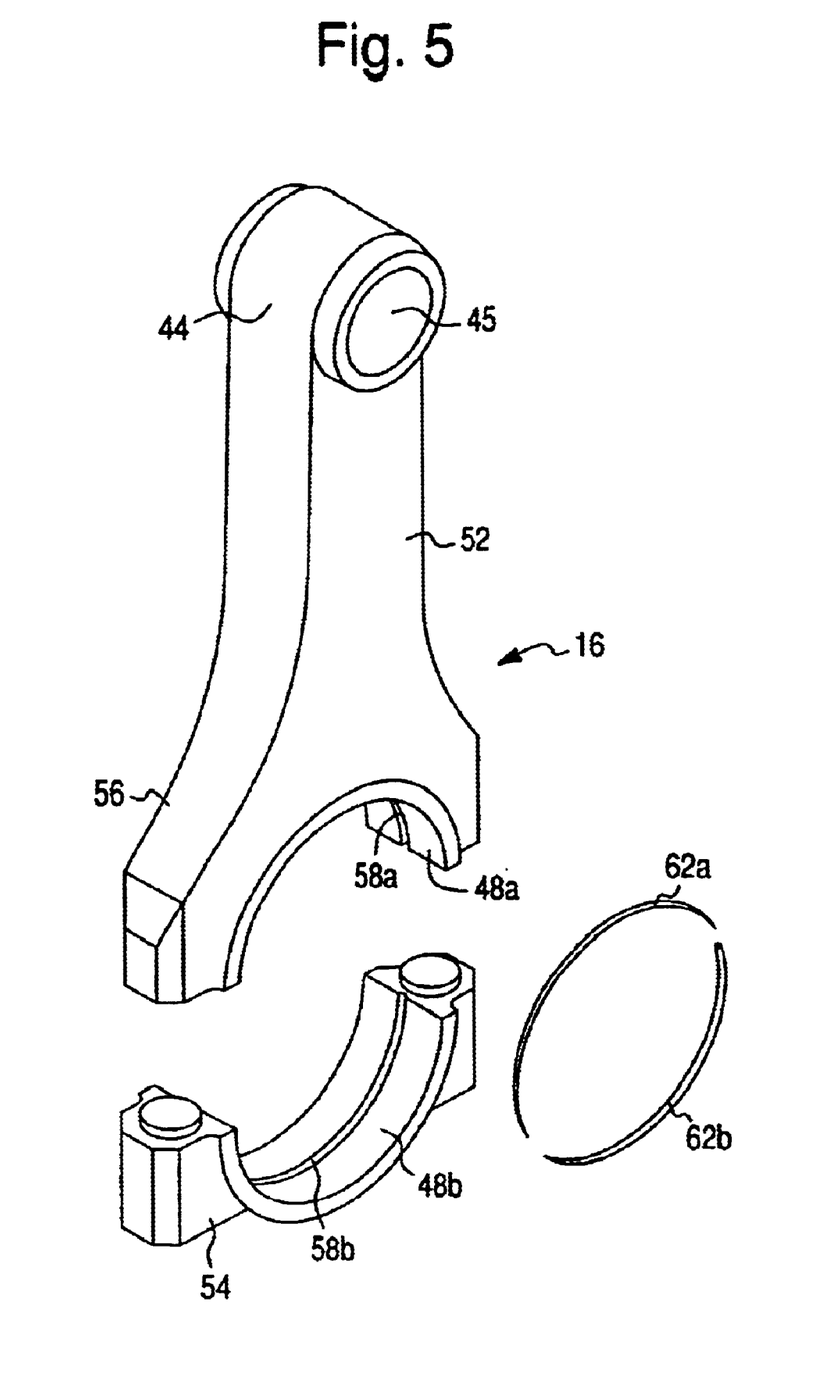
FIG. 5 is an exploded perspective view of a connecting rod incorporating vibration dampener members in accordance with the third exemplary embodiment of the present invention.
Figure 6:
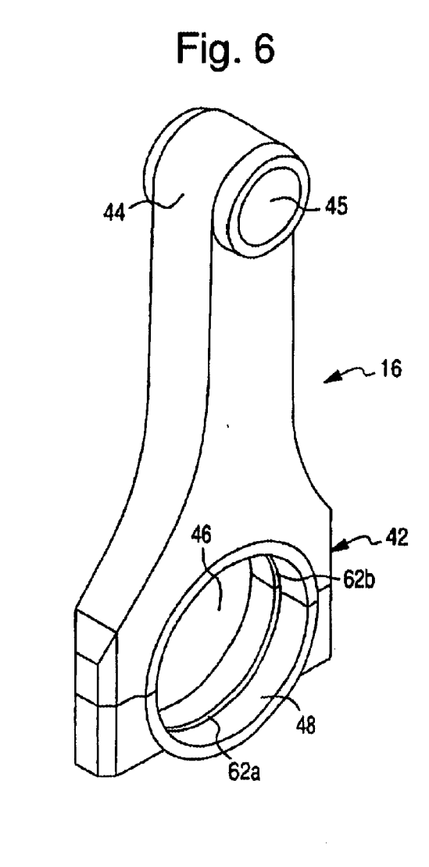
FIG. 6 is a perspective view of the assembled connecting rod according to the third exemplary embodiment of the present invention.
Figure 7:
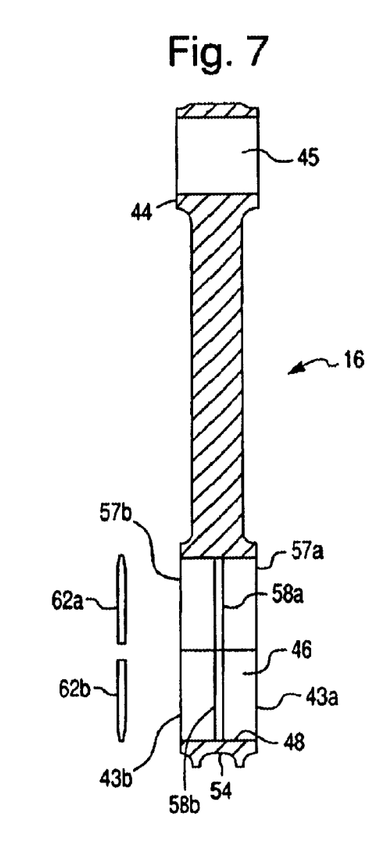
FIG. 7 is a cross sectional view of the assembled connecting rod according to the third exemplary embodiment of the present invention.

As illustrated in FIGS. 5–7, the connecting rod 16 in accordance with the present invention, has a split first end 42 adapted for holding the rod journal 12 of the crankshaft 10 and connecting rod bearing shells, and a second end 44 defining a pin opening 45 provided to receive a piston pin (not illustrated in the drawings). The first end 42 has a crank bore 46 adapted for receiving the rod journal 12 of the crankshaft 10 and the connecting rod bearing shells, and defined by an annular, substantially cylindrical inner wall 48. The crank bore 46 of the first end 42 of the connecting rod 16 has two longitudinally opposite ends 50a and 50b defining a thickness of the crank bore 46.

As further illustrated in FIGS. 5–7, the connecting rod 16 comprises a connecting rod shank 52 and a bearing cap 54 connected to the connecting rod shank 52 by any suitable means well known in the art, such as threaded bolt connection, to circumscribe the rod journal 12 of the crankshaft 10. The connecting rod shank 52 includes a first end portion 56 having a substantially semi-cylindrical inner wall 48a. The bearing cap 54, in turn, has a substantially semi-cylindrical inner wall 48b adapted to cooperate with the semi-cylindrical inner wall 48a of the first end portion 56 of the connecting rod shank 52 to define the crank bore 46 of the connecting rod 16 (as shown in FIG. 5).

In order to effectively reduce and eliminate the transmission of vibrations (including harmonics) from the connecting rod to the crankshaft and/or from the crankshaft to the cylinder block, a vibration dampener assembly is disposed between the connecting rod 16 and the crankshaft 10 and/or between the crankshaft 10 and the cylinder block 3.

The vibration dampener assembly in accordance with the first exemplary embodiment of the present invention comprises a pair of axially spaced, substantially semi-annular recessed portions $38_1$ and $38_2$ formed in the inner wall 36 of the main bearing cap 35, a pair of axially spaced, substantially semi-annular recessed portion $23_1$ and $23_2$ formed in the inner wall 24 of the main bearing portions 22 of the crankshaft support member 20, and two pairs of opposite, semi-annular vibration dampener members 60a and 60b (shown in FIG. 1) each disposed in the semi-annular recessed portion $23_1$, $23_2$ and $38_1$, $38_2$ respectively. The crankshaft support member 20 functions as a coupling member rotatably coupled to the main journal 18 of the crankshaft 10. Moreover, the semi-annular recessed portions $38_1$ and $38_2$ are axially spaced from the opposite ends 37a and 37b of the inner wall 36 of the main bearing cap 35, while the semi-annular recessed portions $23_1$ and $23_2$ formed in the inner wall 36 of the main bearing cap 35 are axially spaced from the opposite ends 25a and 25b of the inner wall 24 of the main bearing portions 22 of the crankshaft support member 20. Preferably, the recessed portions $38_1$, $38_2$ and $23_1$, $23_2$ are substantially equidistantly spaced from the opposite ends 37a and 37b of the inner wall 36 of the main bearing cap 35 and opposite ends 25a and 25b of the inner wall 24 of the main bearing portions 22, respectively. However, it will be appreciated by those skilled in the art that the recessed portions $23_1$, $23_2$ and $38_1$, $38_2$ may be unequally offset from the opposite ends of the inner walls 24 and 36.

Figure 14:
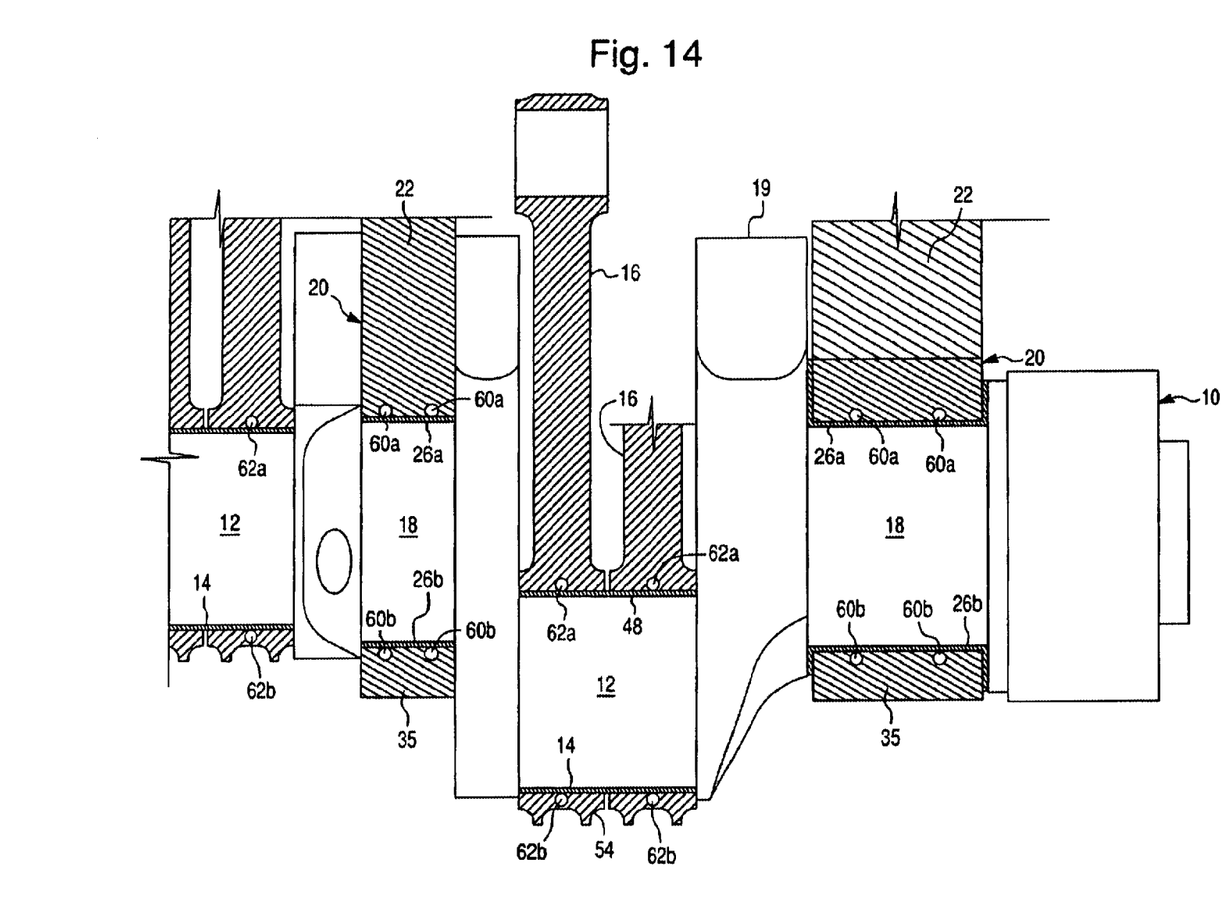
FIG. 14 is a partial cross sectional view of the internal combustion engine according to the fifth exemplary embodiments of the present invention.

Preferably, the vibration dampener members 60a and 60b slightly extend from the recessed portions $23_1$, $23_2$ and $38_1$, $38_2$ so that the vibration dampener members 60a and 60b are in contact and somewhat compressed by the bearing shells 26a and 26b, thus significantly dampening a transmission of vibrations from the connecting rod 10 to the cylinder block 3, as illustrated in FIG. 14.

Further preferably, each pair of the vibration dampener members 60a and 60b together forms an O-ring-like member and each vibration dampener member has a substantially circular cross-section. Correspondingly, the semi-annular recessed portions $23_1$, $23_2$ and $38_1$, $38_2$ have substantially semi-circular cross-sections substantially complementary to the cross-sections of the vibration dampener members 60a and 60b. It will be appreciated by those skilled in the art that the semi-annular recessed portions $23_1$, $23_2$ and $38_1$, $38_2$ and the vibration dampener members 60a and 60b may alternatively have any other appropriate cross-sections, such as substantially rectangular or oval. Preferably, the vibration dampener members 60a and 60b are made of a slippery elastomeric oil resistant rubber-like material. However, other vibration absorbent material may be used such as oil resistant elastomeric plastic or other synthetic materials.

Those skilled in the art will understand that the connecting rod the present invention may have more than two pairs of semi-annular vibration dampener members, such as three, four, etc. depending on the particular application.

Figure 8:
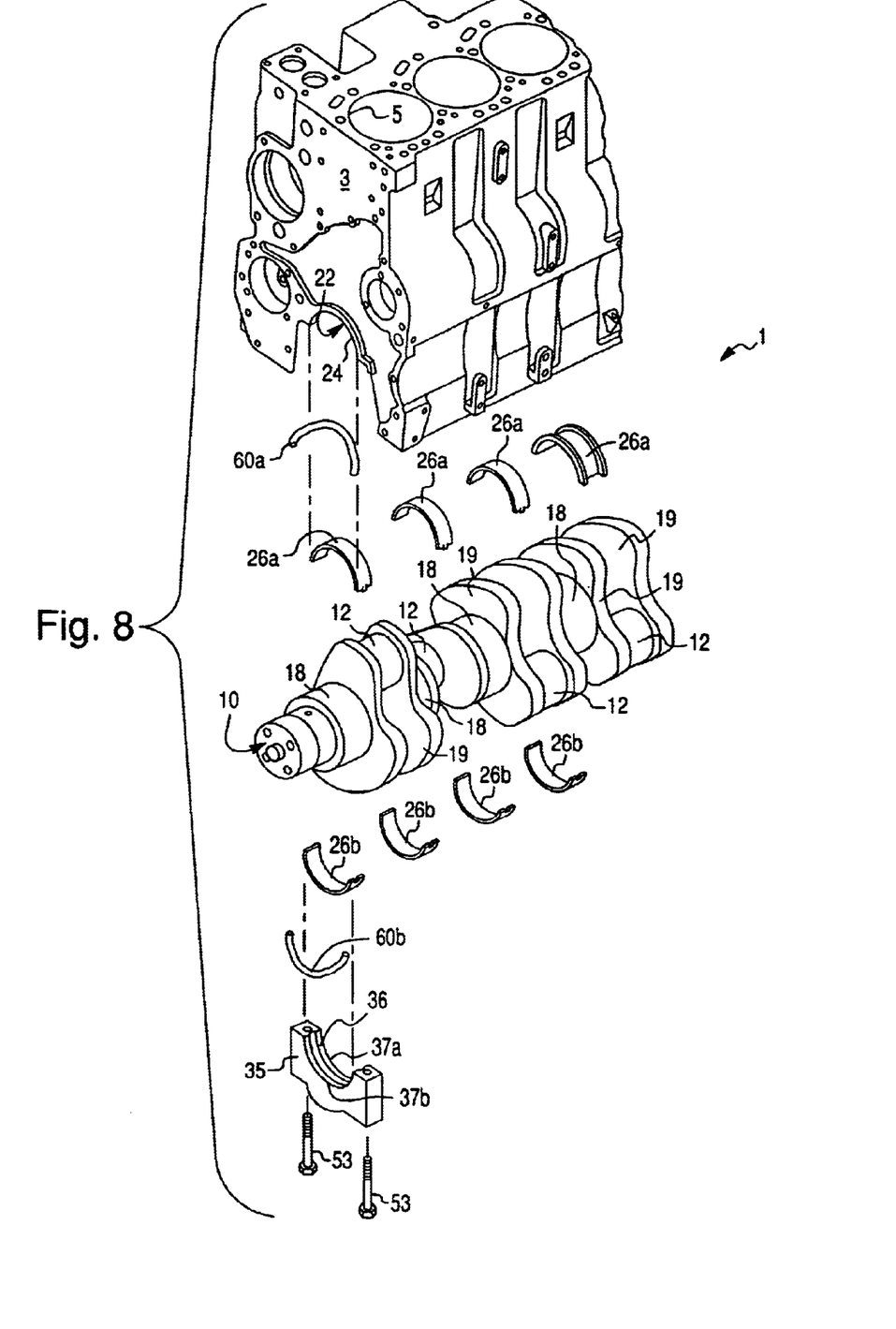
FIG. 8 is a partial exploded view of an internal combustion engine according to the second exemplary embodiment of the present invention.
Figure 9:
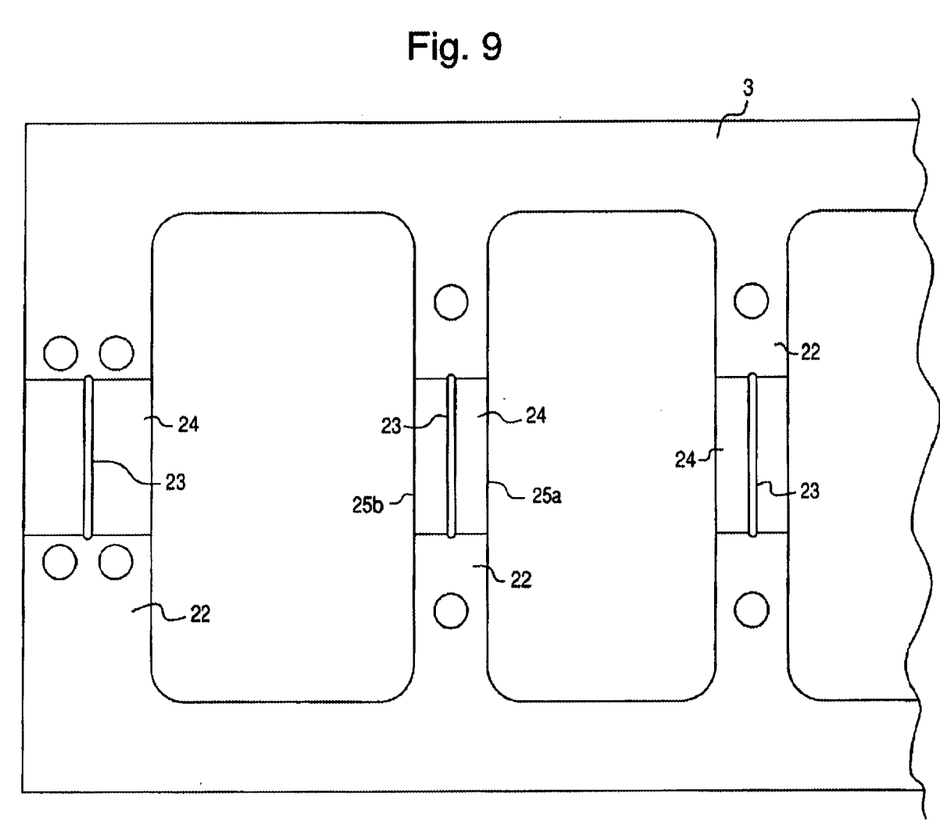
FIG. 9 is a bottom view of the cylinder block of the internal combustion engine with removed main bearing caps in accordance with the second exemplary embodiment of the present invention.
Figure 10:
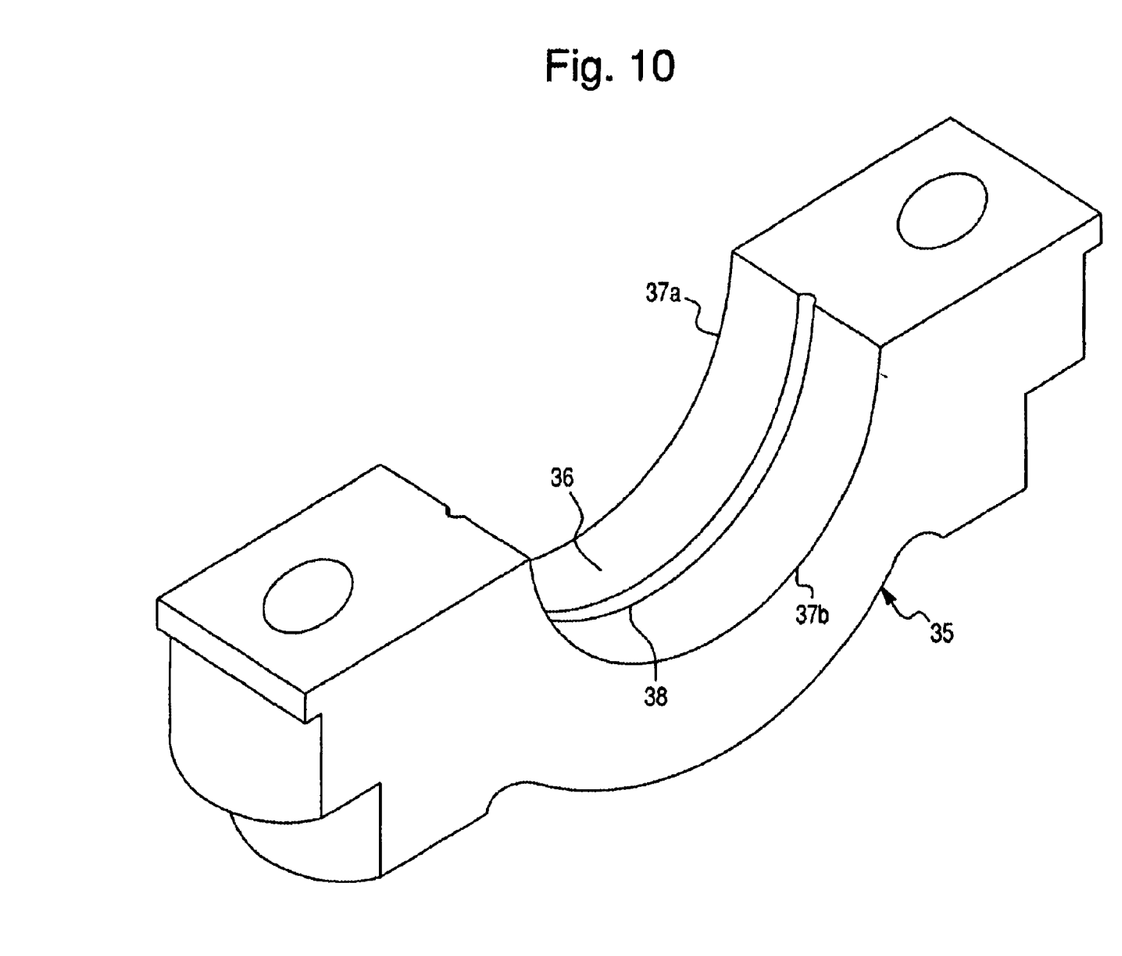
FIG. 10 is a perspective view of a main bearing cap according to the second exemplary embodiment of the present invention.

FIGS. 8–10 illustrate a second exemplary embodiment of the vibration dampener assembly in accordance with the present invention. Components, which are unchanged from, or function in the same way as in the first exemplary embodiment depicted in FIGS. 1–4 are labeled with the same reference characters. The crankshaft support member of the second exemplary embodiment of the present invention corresponds substantially to the crankshaft support member 20 of FIGS. 1–4, with the exception that the inner wall of the crankshaft support member 20 defining the crank bore 17 is provided with a single recessed portion that will therefore be explained in detail below.

The vibration dampener assembly in accordance with the second exemplary embodiment of the present invention comprises a substantially semi-annular recessed portion 38 formed in the inner wall 36 of the main bearing cap 35, a substantially semi-annular recessed portion 23 formed in the inner wall 24 of the main bearing portions 22 of the crankshaft support member 20, and a pair of opposite, semi-annular vibration dampener members 60a and 60b each disposed in the semi-annular recessed portion 23 and 38 respectively. The crankshaft support member 20 functions as a coupling member rotatably coupled to the main journal 18 of the crankshaft 10. Moreover, the semi-annular recessed portion 38 is axially spaced from the opposite ends 37a and 37b of the inner wall 36 of the main bearing cap 35, as illustrated in detail in FIG. 10, while the semi-annular recessed portion 23 formed in the inner wall 36 of the main bearing cap 35 and axially spaced from the opposite ends 25a and 25b of the inner wall 24 of the main bearing portions 22 of the crankshaft support member 20, as illustrated in detail in FIG. 9. Preferably, the recessed portions 23 and 38 are substantially equidistantly spaced from the opposite ends 37a and 37b of the inner wall 36 of the main bearing cap 35 and opposite ends 25a and 25b of the inner wall 24 of the main bearing portions 22, i.e. disposed substantially in the middle of the inner walls 36 and 24. However, it will be appreciated by those skilled in the art that the recessed portions 23 and 38 may be unequally offset from the opposite ends of the inner walls 36 and 24.

Preferably, the vibration dampener members 60a and 60b slightly extend from the recessed portions 23 and 38 so that the vibration dampener members 60a and 60b are in contact and somewhat compressed by the bearing shells 26a and 26b, thus significantly dampening a transmission of vibrations from the connecting rod 10 to the cylinder block 3. Further preferably, the two vibration dampener members 60a and 60b together form an O-ring like ring and have substantially circular cross-sections. Correspondingly, the semi-annular recessed portions 23 and 38 have substantially semi-circular cross-sections substantially complementary to the cross-sections of the vibration dampener members 60a and 60b. It will be appreciated by those skilled in the art that the semi-annular recessed portions 23 and 38 and the vibration dampener members 60a and 60b may alternatively have any other appropriate cross-sections, such as substantially rectangular or oval. Preferably, the vibration dampener members 60a and 60b are made of a slippery elastomeric oil resistant rubber-like material. However, other vibration absorbent material may be used such as oil resistant elastomeric plastic or other synthetic materials.

FIGS. 5–7 illustrate a third exemplary embodiment of the vibration dampener assembly in accordance with the present invention. Here the split first end 42 of the connecting rod 16 functions as a coupling member rotatably coupled to the rod journal 12 of the crankshaft 10.

As illustrated in detail in FIG. 5, a substantially semi-annular recessed portion 58a is formed in the semi-cylindrical inner wall 48a of the first end portion 56 of the connecting rod shank 52, and a complementary substantially semi-annular recessed portion 58b is formed in the semi-cylindrical inner wall 48b of the bearing cap 54. The recessed portions 58a and 58b are adapted to receive annular vibration dampener members 62a and 62b, respectively, provided for significantly dampening a transmission of vibrations from the connecting rod 16 to the crankshaft 10. Preferably, as illustrated in FIG. 6, the recessed portions 58a and 58b are substantially equidistantly offset from opposite ends 57a and 57b of the first end portion 56 of the connecting rod 16 and opposite ends 43a and 43b of the bearing cap 54 respectively, i.e. disposed substantially in the middle of the inner wall 48. However, it will be appreciated by those skilled in the art that the recessed portions 58a and 58b may be unequally offset from the opposite ends of the first end 42 of the first end portion 56 of the connecting rod 16 and of the bearing cap 54 of the connecting rod 16.

Preferably, the vibration dampener members 62a and 62b slightly extend from the recessed portions 58a and 58b so that the vibration dampener members 62a and 62b are in contact and somewhat compressed by bearing shells, thus significantly dampening a transmission of vibrations from the connecting rod 16 to the crankshaft 10.

Further preferably, the two vibration dampener members 62a and 62b together form an O-ring like ring and have substantially circular cross-sections. Correspondingly, the semi-annular recessed portions 58a and 58b have substantially semi-circular cross-sections substantially complementary to the cross-sections of the vibration dampener members 62a and 62b. It will be appreciated by those skilled in the art that the semi-annular recessed portions 58a and 58b and the vibration dampener members 62a and 62b may alternatively have any other appropriate cross-sections, such as substantially rectangular or oval. Preferably, the vibration dampener members 62a and 62b are made of a slippery elastomeric oil resistant rubber-like material. However, other vibration absorbent material may be used such as oil resistant elastomeric plastic or other synthetic materials.

Figure 11:
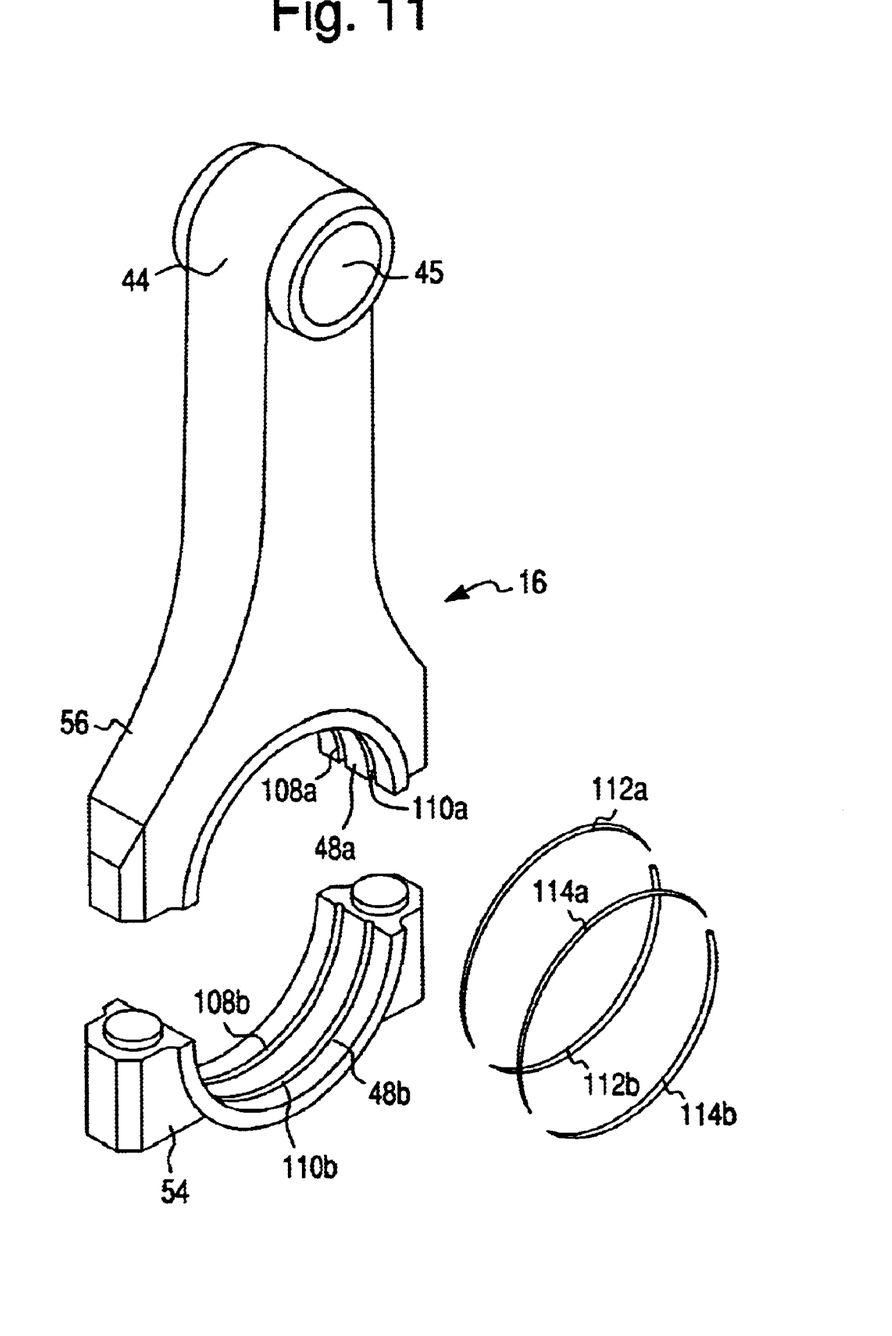
FIG. 11 is an exploded perspective view of the connecting rod incorporating vibration damper members in accordance with the fourth exemplary embodiment of the present invention.
Figure 12:
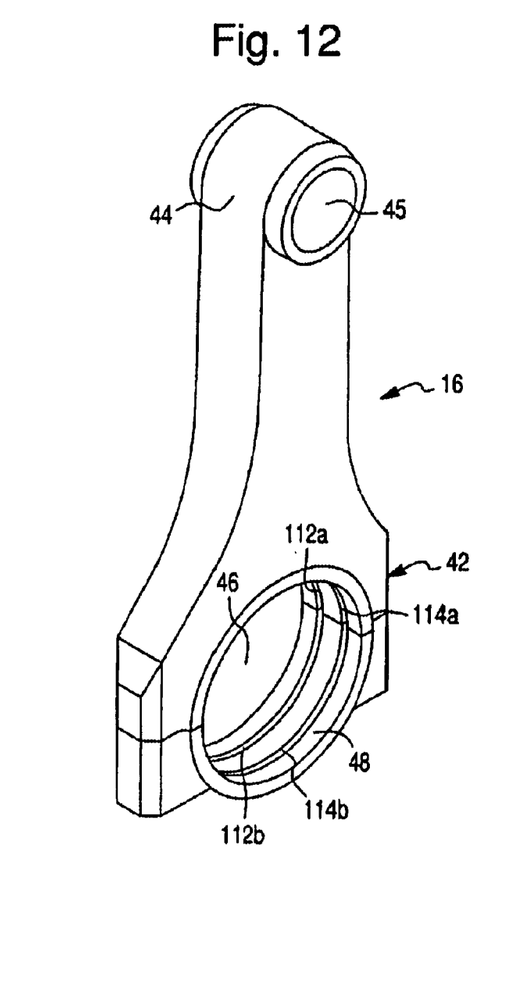
FIG. 12 is a perspective view of the assembled connecting rod according to the fourth exemplary embodiment of the present invention.
Figure 13:
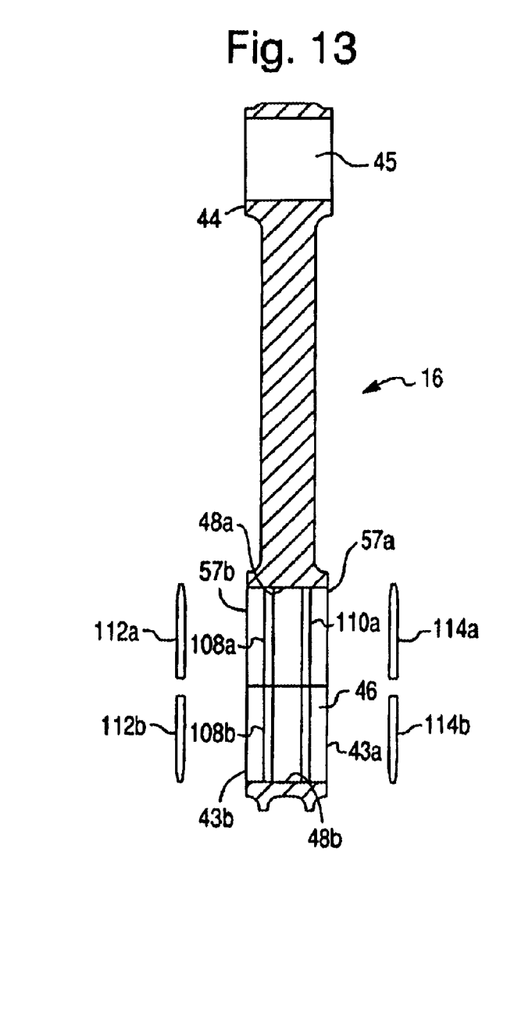
FIG. 13 is a cross sectional view of the assembled connecting rod according to the fourth exemplary embodiment of the present invention.

FIGS. 11–13 illustrate a fourth exemplary embodiment of the connecting rod in accordance with the present invention. Components, which are unchanged from, or function in the same way as in the first exemplary embodiment depicted in FIGS. 5–7 are labeled with the same reference characters. The connecting rod 16 of the fourth exemplary embodiment of the present invention corresponds substantially to the connecting rod of FIGS. 5–7 with the exception that the inner wall 48 of the first end 42 of the connecting rod 16 defining the crank bore 46 is provided with two recessed portions that will therefore be explained in detail below.

As illustrated in detail in FIG. 11, two spaced, substantially semi-annular recessed portions 108a and 110a are formed in the semi-cylindrical inner wall 48a of the first end portion 56 of the connecting rod shank 52, and two complementary substantially semi-annular recessed portions 108b and 110b are formed in the semi-cylindrical inner wall 48b of the bearing cap 54. The recessed portions 108a and 110a are adapted to receive semi-annular vibration dampener members 112a and 114a, respectively, substantially identical to the vibration dampener members 62a, while the recessed portions 108b and 110b are adapted to receive semi-annular vibration dampener members 112b and 114b, respectively, substantially identical to the vibration dampener members 62b provided for significantly dampening a transmission of vibrations from the connecting rod 16 to the crankshaft 10.

Preferably, as illustrated in FIGS. 11 and 13, the recessed portions 108a, 110a and 108b, 110b are substantially equidistantly offset from opposite ends 57a and 57b of the first end portion 56 of the connecting rod 16 and opposite ends 43a and 43b of the bearing cap 54 respectively. However, it will be appreciated by those skilled in the art that the recessed portions 108a, 110a and 108b, 110b may be unequally offset from the opposite ends of the first end 42 of the first end portion 56 of the connecting rod 16 and of the bearing cap 54 of the connecting rod 16.

Those skilled in the art will understand that the connecting rod the present invention may have more than two pairs of semi-annular vibration dampener members, such as three, four, etc. depending on the particular application.

Moreover, those skilled in the art will also understand that the vibration dampening arrangement of the present invention can be used in many different types of mechanisms, other than the internal combustion engines, employing the connecting rod/crankshaft combination, such as piston pumps, pneumatic or hydraulic piston actuators, etc.

FIG. 14 illustrates a fifth exemplary embodiment of the present invention depicting a V-type engine vibration dampener arrangement. In this embodiment, each of two juxtaposed connecting rods 16 has a pair of vibration dampener members 62a and 62b disposed in the annular recessed portions formed in the inner wall 48 of the first end of the connecting rod 16. Alternatively, as disclosed above, each of the juxtaposed connecting rods may have two or more than two pairs of the vibration dampener members. As illustrated, each of the juxtaposed connecting rods 16 is connected to the rod journal 18 of the crankshaft 10 of the V-type internal combustion engine through the connecting rod bearing 14. Furthermore, two pairs of the vibration dampener members 60a and 60b are disposed in the recessed portions in the crankshaft support member 20 so that the vibration dampener members 60a and 60b are in contact and somewhat compressed by the bearing shells 26a and 26b.

Therefore, the vibration dampener members 60a, 60b, and 62a, 62b effectively reduce and nearly eliminate the transmission of vibrations from the connecting rods 16 to the crankshaft 10 and from the crankshaft 10 to the cylinder block 3 and through the entire engine and power train assembly.

The foregoing description of the preferred exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An internal combustion engine comprising:
    a crankshaft having at least one rod journal and at least one main journal;
    a cylinder block rotatably supporting said crankshaft;
    at least one coupling member rotatably coupled to said crankshaft;
    said at least one coupling member having an annular, substantially cylindrical inner wall defining a crank bore circumscribing one of said at least one main journal and said at least one rod journal of said crankshaft;
    said inner wall of said crank bore having at least one substantially annular recessed portion formed therein, said at least one recessed portion is axially spaced from opposite ends of said inner wall; and
    a vibration dampener assembly disposed in said at least one recessed portion thereby substantially dampening a transmission of vibrations in said internal combustion engine.

2. The internal combustion engine according to claim 1, wherein said at least one annular recessed portion is axially equidistantly spaced from said opposite ends of said inner wall.

3. The internal combustion engine according to claim 1, wherein said at least one coupling member includes a main portion and a bearing cap attached to said main portion to define said crank bore, each of said main portion and said bearing cap having at least one substantially semi-annular recessed portion complementary to each other and together defining said annular recessed portion.

4. The internal combustion engine according to claim 3, wherein said vibration dampener assembly comprises at least one first semi-annular vibration dampener member and at least one second semi-annular vibration dampener member complementary to each other, said at least one first vibration dampener member is disposed in said at least one recessed portion in said main portion and said at least one second vibration dampener member disposed in said at least one recessed portion in said bearing cap, said at least one first and second semi-annular members together substantially circumscribing said one of said at least one main journal and said at least one rod journal of said crankshaft.

5. The connecting rod according to claim 4, wherein said at least one first semi-annular vibration dampener member and at least one second semi-annular vibration dampener member both have a substantially circular cross-section.

6. The connecting rod according to claim 4, wherein said first and second semi-annular vibration dampener members are made of an oil resistant elastomeric rubber-like material.

7. The internal combustion engine according to claim 1, wherein said vibration dampener assembly comprising at least one first semi-annular vibration dampener member and at least one second semi-annular vibration dampener member complementary to each other and disposed in said at least one recessed portion in said inner wall.

8. The connecting rod according to claim 7, wherein said at least one first semi-annular vibration dampener member and at least one second semi-annular vibration dampener member both have a substantially circular cross-section.

9. The connecting rod according to claim 7, wherein said first and second semi-annular vibration dampener members are made of an oil resistant elastomeric rubber-like material.

10. The internal combustion engine according to claim 1, wherein said at least one coupling member is a crankshaft support member comprising a main bearing portion attached to said engine block and a main bearing cap secured to said main bearing portion, each of said main bearing portion and said main bearing cap having at least one substantially semi-annular recessed portion complementary to each other and together defining said recessed portion circumscribing said at least one main journal of said crankshaft.

11. The internal combustion engine according to claim 10, wherein said vibration dampener assembly comprises at least one first semi-annular vibration dampener member and at least one second semi-annular vibration dampener member complementary to each other, said at least one first vibration dampener member is disposed in said at least one recessed portion in said main bearing portion and said at least one second vibration dampener member disposed in said at least one recessed portion in said main bearing cap, said at least one first and second semi-annular members together substantially circumscribing said at least one main journal of said crankshaft.

12. The internal combustion engine according to claim 10, wherein said main bearing portion is integrally formed with said engine block.

13. The internal combustion engine according to claim 10, wherein each of said main bearing portion and said main bearing cap of said crankshaft support member having two substantially semi-annular recessed portions complementary to each other and together defining said crank bore circumscribing said at least one main journal of said crankshaft, and wherein said vibration dampener assembly comprises two first semi-annular vibration dampener members and two second semi-annular vibration dampener members complementary to each other, said two first vibration dampener members are disposed in said two recessed portion in said main bearing portion and said two second vibration dampener members are disposed in said two recessed portion in said main bearing cap, said two first and second semi-annular members together substantially circumscribing said at least one main journal of said crankshaft.

14. The internal combustion engine according to claim 1, wherein said at least one coupling member is a connecting rod comprising a connecting rod shank and a bearing cap secured to said connecting rod shank, each of said connecting rod shank and said bearing cap having at least one substantially semi-annular recessed portion complementary to each other and together defining said recessed portion circumscribing said at least one rod journal of said crankshaft.

15. The internal combustion engine according to claim 14, wherein said vibration dampener assembly comprises at least one first semi-annular vibration dampener member and at least one second semi-annular vibration dampener member complementary to each other, said at least one first vibration dampener member is disposed in said at least one recessed portion in said connecting rod shank and said at least one second vibration dampener member disposed in said at least one recessed portion in said bearing cap, said at least one first and second semi-annular members together substantially circumscribing said at least one rod journal of said crankshaft.

16. The internal combustion engine according to claim 14, wherein each of said connecting rod shank and said bearing cap of said connecting rod having two substantially semi-annular recessed portions complementary to each other and together defining said crank bore circumscribing said at least one rod journal of said crankshaft, and wherein said vibration dampener assembly comprises two first semi-annular vibration dampener members and two second semi-annular vibration dampener members complementary to each other, said two first vibration dampener members are disposed in said two recessed portion in said connecting rod shank and said two second vibration dampener members are disposed in said two recessed portions in said bearing cap, said two first and second semi-annular members together substantially circumscribing said at least one rod journal of said crankshaft.

17. The internal combustion engine according to claim 14, wherein at least one first and second semi-annular vibration dampener members somewhat extend from said at least one semi-annular recessed portions in said main portion and in said bearing cap so that said vibration dampener members are in contact and somewhat compressed by bearing shells of said crankshaft for significantly dampening a transmission of vibrations from said connecting rod to said cylinder block.

* * * * *